United States Patent Office 3,440,288
Patented Apr. 22, 1969

3,440,288
METHOD FOR PREPARING CHLOROBENZENE THIOLS
Hermann Hoffmann, East Greenwich, and Samuel F. Marsocci, West Warwick, R.I., assignors, by mesne assignments, to Farbwerke Hoechst AG, vormals Meister Lucius & Bruening, Frankfurt am Main, Germany
No Drawing. Filed June 15, 1966, Ser. No. 557,602
Int. Cl. C07c *149/00, 143/00*
U.S. Cl. 260—609                    12 Claims

ABSTRACT OF THE DISCLOSURE

Method of making monochlorobenzene thiol or dichlorobenzene thiol by adding zinc an chlorosulfonic acid solution of monochlorobenzene sulfonyl chloride or dichlorobenzene sulfonyl chloride to water or aqueous acid.

---

This invention relates to methods for preparing chlorobenzene thiols, including mono- and di-chlorobenzene thiols.

It is known that p-dichlorobenzene thiol, which is useful as an intermediate in the manufacture of thioindigo dyes, can be prepared by the reduction of p-dichlorobenzene sulfonyl chloride with zinc and aqueous sulfuric acid. The reduction is carried out by adding zinc to a mixture of p-dichlorobenzene sulfonyl chloride and aqueous sulfuric acid [Monatshefte für Chemie 48, 627 (1927)]. The reduction of aromatic sulfonyl chlorides with zinc and acid is a general method for the preparation of aromatic thiols. However, the reaction is exothermic and when performed in the manner described above has a tendency to become quite violent, especially when larger quantities of the thiol are prepared [Organic Synthesis, Coll. vol. I, 504 (1964)].

It has now been found that the sulfonyl chlorides of mono- and di-chlorobenzenes can be reduced in an advantageous and easily controllable manner by the addition of zinc, preferably in finely divided form, and a solution of a chlorobenzene sulfonyl chloride in chlorosulfonic acid to water or to an aqueous mineral acid, preferably sulfuric acid, while maintaining a temperature within the range from about 40° to about 90° C., preferably in the range from about 60° C. to about 90° C. The zinc and chlorosulfonic acid solution can be added to the aqueous acid continuously, or incrementally. In the latter case, portions of the two reagents may be added concurrently or consecutively.

When the reaction is performed in this manner, the chlorobenzene sulfonyl chloride reacts rapidly to form the corresponding chlorobenzene thiol. Thus, large amounts of chlorobenzene sulfonyl chloride or of zinc are not present in the reaction mixture at any stage of the reaction. The rate of the reaction is readily controlled by the rate of addition of the chlorobenzene sulfonyl chloride solution and zinc to maintain a temperature within the above-described range. The reaction vessel is preferably cooled, for example by the use of cold water, to give additional temperature control. The rate of addition of the starting materials to the reaction vessel depends inter alia on the effectiveness of the cooling.

The solutions of monochlorobenzene- or dichlorobenzene-sulfonyl chloride employed as a reagent are advantageously prepared by reacting the corresponding mono- or di-chlorobenzene with chlorosulfonic acid. Although the solutions so obtained may be used directly as a starting material, the solutions contain sulfuric acid and chlorobenzene sulfonic acids as by-products in amounts dependent upon the amounts of chlorobenzene and chlorosulfonic acid reacted. Higher yields of the chlorobenzene thiol final product (based on the chlorobenzene starting material) are obtained if the solutions are further treated with certain chlorinating agents such as carbon tetrachloride, thionyl chloride, or phosphorus trichloride, to convert chlorobenzene sulfonic acids present therein to the corresponding chlorobenzene sulfonyl chlorides.

The concentration of chlorobenzene sulfonyl chloride in the chlorosulfonic acid solutions may vary over a wide range and is not critical. Solutions containing from about 0.2 to about 1 mol of a chlorobenzene sulfonyl chloride per mol of chlorosulfonic acid are particularly convenient.

Chlorosulfonic acid reacts with water to form sulfuric acid and hydrochloric acid. Thus, solutions of a chlorobenzene sulfonyl chloride in chlorosulfonic acid may be added to water to generate all or a part of the acid necessary for reduction of the sulfonyl chloride to the corresponding thiol. A mineral acid such as hydrochloric, phosphoric, or, preferably, sulfuric acid may be added to the water prior to the addition thereto of zinc and a chlorosulfonic acid solution.

When all of the requisite acid is generated from chlorosulfonic acid, the ratio by weight of chlorosulfonic acid to water is suitably at least about 1 to about 0.75. The ratio is decreased, of course, if acid is initially present in the water, e.g. from about 1 to 0.8 or 1 to 1 for 4–5% solutions of $H_2SO_4$, or as low as about 1 to 2.3 or 1 to 3 for a 35% $H_2SO_4$ solution.

Zinc is suitably reacted with a chlorobenzene sulfonyl chloride in a mol ratio of at least about 3.5 to 1, conveniently from about 4 to 4.5 to 1.

The chlorobenzene thiols produced in the above-described manner can be conveniently obtained from a reaction mixture in which they are contained by steam distillation, for example. To prevent the oxidation of the thiol product to the corresponding disulfide, it is preferred to condense the product with monochloroacetic acid, e.g. to form 2,5-dichlorophenyl thioglycolic acid from p-dichlorobenzene thiol. The latter acid, specifically, is a further intermediate in the preparation of thioindigo dyes (cf. German patent 241,910).

Since, on the one hand, chlorosulfonic acid is known to react violently with water accompanied by the evolution of considerable heat [Moeller, Inorganic Chemistry, John Wiley and Sons, Inc. New York (1952), p 524] and, on the other hand, aromatic sulfonyl chlorides are known to undergo hydrolysis at elevated temperatures, aromatic sulfonyl chlorides prepared by reacting aromatic compounds with excess chlorosulfonic acid are usually isolated by quenching the reaction mixtures with ice and water. [Houben-Weyl Methoden der organischen Chemie, volume 9, p. 569 (1955)]. In view of these facts, it is surprising that in the method of the present invention, in which aromatic sulfonyl chlorides in chlorosulfonic acid solutions are contacted with aqueous acid at elevated temperatures, there is practically no dydrolysis of the sulfonyl chloride group. This is indicated by the high yields of the chlorobenzene thiol products.

A better understanding of the present invention and of its many advantages will be had by referring to the folvolume 9, p. 569 (1955)]. In view of these facts, it is

Example 1

441 g. (3.0 mols) of p-dichlorobenzene and 1747 g. (15 mols) of chlorosulfonic acid were heated to a temperature of 110° C. for two hours. The resulting solution, which contained approximately 3.0 mols of p-dichlorobenzene sulfonyl chloride and 12.0 mols of chlorosulfonic acid, was added, together with 840 g. of powdered zinc, to 1800 g. of aqueous sulfuric acid containing 4.2 percent by weight of $H_2SO_4$. During the addition, the temperature was maintained in the range between 60° C.–90° C., if necessary by cooling with cold water. Addition of the reagents extended over 3.5 hours. After the addition was complete, the p-dichlorobenzene thiol product was obtained by steam distillation and subsequently condensed with monochloroacetic acid to form 2,5-dichlorophenyl thioglycolic acid. The overall yield was 81 percent based on p-dichlorobenzene. The melting point of the acid was 129°–131° C.

Example 2

368 g. (2.5 mols) of p-dichlorobenzene and 583 g. (5.0 mols) of chlorosulfonic acid were heated at 110° C. for one hour. After this initial reaction, 327 g. (2.75 mols) of thionyl chloride were added at 80° C. and the solution was then heated at 110° C. for two hours. The resulting solution was cooled and added, together with 695 g. of powdered zinc, to 2700 g. of aqueous sulfuric acid containing 35 percent by weight of $H_2SO_4$. Addition was completed over a period of two hours while maintaining a temperature within the range from 40° C.–90° C. After the addition was complete, the p-dichlorobenzene thiol was steam distilled and condensed with monochloroacetic acid to form 2,5-dichlorophenyl thioglycolic acid. The overall yield was 94 percent based on p-dichlorobenzene. The melting point of the acid was 129°–131° C.

Example 3

73.6 g. (0.5 mol) of p-dichlorobenzene and 116.5 g. (1.0 mol) of chlorosulfonic acid were heated for one hour at 110° C. 48.2 g. (0.35 mol) of phosphorus trichloride were added at 80°–90° C., and the solution was further heated for two hours at 110° C. After cooling, the solution, which contained about 0.5 mol of p-dichlorobenzene sulfonyl chloride and 0.5 mol of chlorosulfonic acid, was decanted from solid phosphorous acid formed in the reaction. The solution was then added, together with 140 g. of powdered zinc, to 560 g. of aqueous sulfuric acid containing 35 percent by weight of $H_2SO_4$ during a period of one hour while maintaining a temperature between 60° C. and 90° C. After the addition was completed, the p-dichlorobenzene thiol was steam distilled and subsequently condensed with monochloroacetic acid to form 2,5-dichlorophenyl thioglycolic acid. The overall yield was 93 percent based on p-dichlorobenzene. The melting point of the acid was 129°–131° C.

Example 4

882 g. (6.0 mols) of p-dichlorobenzene and 1398 g. (12.0 mols) of chlorosulfonic acid were heated at 110° C. for two hours, after which 1020 g. (6.6 mols) of carbon tetrachloride were added. The solution was then heated at 110° C. for an additional two hours. This solution, which contained approximately 6 mols of p-dichlorobenzene sulfonyl chloride and 6 mols of chlorosulfonic acid, was added, together with 1670 g. of zinc, to 5200 g. of aqueous sulfuric acid containing 35 percent by weight of $H_2SO_4$ over a period of four hours while maintaining a temperature within the range from 40–90° C. After addition was complete, the p-dichlorobenzene thiol was steam distilled and condensed with monochloroacetic acid to form 2,5-dichlorophenyl thioglycolic acid. The yield was 94 percent, based on p-dichlorobenzene. The melting point of the acid was 129°–131° C.

Example 5

368 g. (2.5 mols) of p-dichlorobenzene and 1747 g. (15 mols) of chlorosulfonic acid were heated at 100° C. for one hour. After this initial reaction, 327 g. (2.75 mols) of thionyl chloride were added at 80° C. and the solution was then heated at 110° C. for two hours. The resulting solution was cooled and added, together with 650 g. of powdered zinc, to 1500 ml. of water. The addition was completed over a period of two hours while maintaining a temperature within the range from 40° C.–90° C. After the addition was complete, the p-dichlorobenzene thiol was steam distilled and condensed with monochloroacetic acid to form 2,5-dichlorophenyl thioglycolic acid. The overall yield was 90 percent based on p-dichlorobenzene. The melting point of the acid was 129°–131° C.

Example 6

297 g. (2 mols) of m-dichlorobenzene (99%) were added to 1400 g. (12 mols) of chlorosulfonic acid at 20° C. over a period of two hours. The solution was heated to 60° C. and maintained at this temperature for four hours. The solution was cooled and added, together with 560 g. of powdered zinc, to 1560 g. of aqueous sulfuric acid containing 3.6 percent by weight of $H_2SO_4$. The addition was completed over a period of two hours while maintaining a temperature from 60°–90° C. After the addition was complete, the 2,4-dichlorobenzenethiol was steam distilled and condensed with monochloroacetic acid to form 2,4-dichlorophenyl thioglycolic acid, an intermediate in the preparation of thioindigo dyestuffs. The overall yield based on m-dichlorobenzene was 84 percent. The melting point was 118.5°–122.5° C.

Example 7

225.0 g. (2 mols) of chlorobenzene were added to 1400 g. (12 mols) of chlorosulfonic acid below 20° C. over a period of two hours. The solution was allowed to warm up to room temperature and stand overnight, after which it was heated to 40° C. for three hours. The solution was cooled to 20° C. and added, together with 560 g. of powdered zinc, to 1560 g. of aqueous sulfuric acid containing 3.6 percent by weight $H_2SO_4$. The addition was completed over a period of three hours while maintaining a temperature within the range of 60°–80° C. After the addition was complete, the 4-chlorobenzene thiol was steam distilled and condensed with monochloroacetic acid to form 4-chlorophenyl thioglycolic acid, an intermediate in the preparation of thioindigo dyestuffs. The overall yield based on chlorobenzene was 74.5 percent. The melting point of the acid was 104°–105° C.

What is claimed is:

1. The method of preparing a chlorobenzene thiol selected from the group consisting of monochlorobenzene thiol and dichlorobenzene thiol which comprises adding zinc and a solution of a corresponding chlorobenzene sulfonyl chloride selected from the group consisting of monochlorobenzene sulfonyl chloride and dichlorobenzene sulfonyl chloride in chlorosulfonic acid to water or an aqueous mineral acid at a temperature of about 40° C. to about 90° C., the mol ratio of zinc to said chlorobenzene sulfonyl chloride being at least about 3.5 to 1.

2. The method as in claim 1 wherein said mineral acid is sulfuric acid.

3. The method as in claim 1 wherein said temperature is from about 60° C. to about 90° C.

4. The method as in claim 1 wherein said aqueous mineral acid is externally cooled during the addition of said zinc and said solution.

5. The method as in claim 1 wherein said chlorobenzene sulfonyl chloride is p-dichlorobenzene sulfonyl chloride.

6. The method as in claim 1 wherein said chlorobenzene sulfonyl chloride is m-dichlorobenzene sulfonyl chloride.

7. The method as in claim 1 wherein said chlorobenzene sulfonyl chloride is monochlorobenzene sulfonyl chloride.

8. The method as in claim 1 wherein said solution of a chlorobenzene sulfonyl chloride in chlorosulfonic acid is prepared by reacting a corresponding chlorobenzene selected from the group consisting of monochlorobenzene and dichlorobenzene with chlorosulfonic acid.

9. The method as in claim 8 wherein the reaction mixture obtained by reacting said chlorobenzene and chlorosulfonic acid is further treated with a chlorinating agent selected from the group consisting of carbon tetrachloride, thionyl chloride, and phosphorous trichloride.

10. The method as in claim 9 wherein said chlorinating agent is carbon tetrachloride.

11. The method as in claim 9 wherein said chlorinating agent is thionyl chloride.

12. The method as in claim 9 wherein said chlorinating agent is phosphorous trichloride.

References Cited

UNITED STATES PATENTS 2,216,849  10/1940  Lubs et al. _____ 260—609
2,792,422  5/1957   Harris et al. _____ 260—609
3,326,981  6/1967   Levy et al. _____ 260—609

OTHER REFERENCES

Houben-Weyl, "Met. der Org. Chemie," vol. 9 (1955). QD258H7, pp. 572–73.

CHARLES B. PARKER, *Primary Examiner.*

D. R. PHILLIPS, *Assistant Examiner.*

U.S. Cl. X.R.

260—543